United States Patent [19]

Tamada et al.

[11] Patent Number: 4,879,645

[45] Date of Patent: Nov. 7, 1989

[54] DATA PROCESSING DEVICE WITH HIGH SECURITY OF STORED PROGRAMS

[75] Inventors: Masuo Tamada, Yokohama; Hitoshi Kokuryo, Sagamihara; Shinsuke Tamura; Hiroshi Ozaki, both of Yokohama, all of Japan

[73] Assignee: Kabushiki Kaisha Toshiba, Kawasaki, Japan

[21] Appl. No.: 157,109

[22] Filed: Feb. 10, 1988

Related U.S. Application Data

[63] Continuation of Ser. No. 714,862, Mar. 22, 1985, abandoned.

[30] Foreign Application Priority Data

Mar. 31, 1984 [JP] Japan .................................. 59-63618

[51] Int. Cl.⁴ .......................... G06F 15/30; G06K 5/00
[52] U.S. Cl. ..................................... 364/200; 235/380; 380/4; 380/23; 380/24; 364/225.2; 364/286.4; 364/286.5; 364/286.6
[58] Field of Search ..................... 380/3, 4, 23, 24, 25; 235/375, 380, 382, 379, 381, 382.5; 364/200 MS File, 900 MS File

[56] References Cited

U.S. PATENT DOCUMENTS

| 4,352,011 | 9/1982 | Guillou | 235/375 |
|---|---|---|---|
| 4,439,670 | 3/1984 | Basset et al. | 235/382 |
| 4,453,074 | 6/1984 | Weinstein | 380/23 |
| 4,484,067 | 11/1984 | Obrecht | 235/380 |
| 4,558,176 | 12/1985 | Arnold et al. | 364/900 |
| 4,583,196 | 4/1986 | Koo | 364/900 |
| 4,740,890 | 4/1988 | William | 364/200 |

FOREIGN PATENT DOCUMENTS

| 54-9859 | 4/1979 | Japan . |
|---|---|---|
| 56-136058 | 10/1981 | Japan . |
| 57-726 | 4/1982 | Japan . |
| 59-41061 | 6/1984 | Japan . |

OTHER PUBLICATIONS

Smart Credit Cards: The Answer to Cashless Shopping, European Search Report EP 85 10 3322.

*Primary Examiner*—Gareth D. Shaw
*Assistant Examiner*—Rebecca L. Rudolph
*Attorney, Agent, or Firm*—Cushman, Darby & Cushman

[57] ABSTRACT

An IC card comprises CPU, PROM for storing programs, and RAM for storing the results of arithmetic operations. PROM stores a table on which the names of specific programs are registered. RAM has execution counters which counts up each time each program is run so that the number of times the specific program is run is memorized. Prior to the running of each program by CPU, it is judged whether or not the program is a specific one. If it is the specific program, the execusion counter counts up. When the count value of the execution counter is above a predetermined value, the running of the specific program is prevented.

12 Claims, 5 Drawing Sheets

F I G. 2
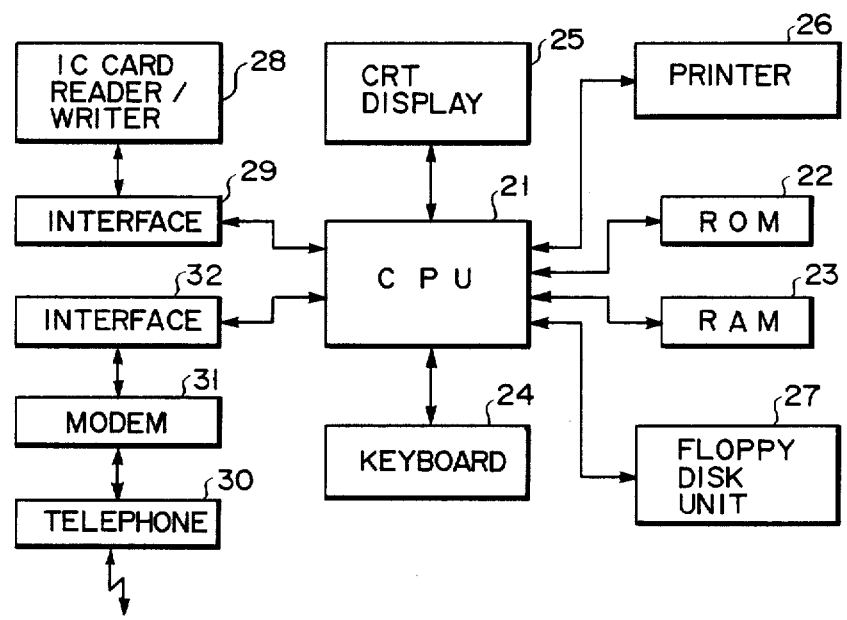
F I G. 3
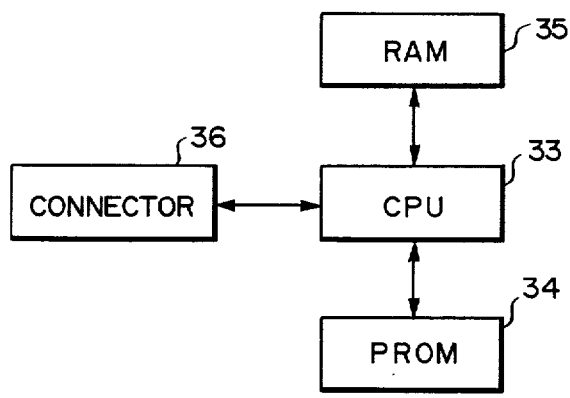

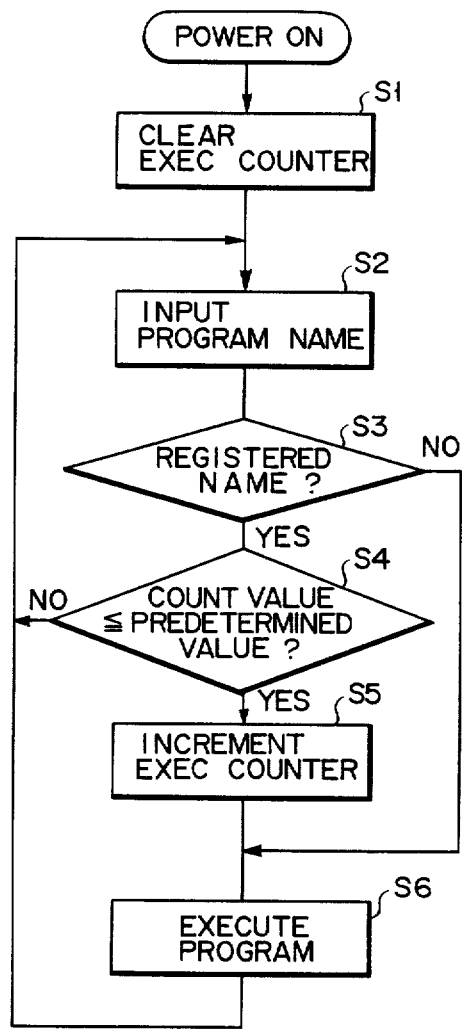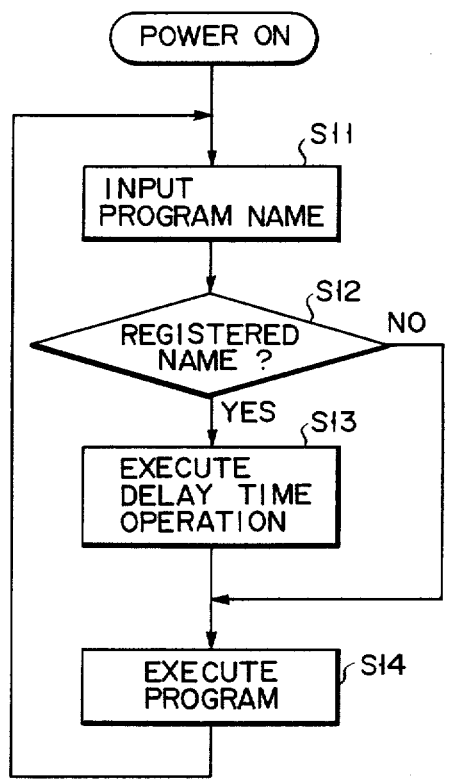

DATA PROCESSING DEVICE WITH HIGH SECURITY OF STORED PROGRAMS

This is a continuation of application Ser. No. 06/714,862, filed Mar. 22, 1985, which was abandoned upon the filing hereof.

BACKGROUND OF THE INVENTION

This invention relates to a data processing device, and more particularly, to the protection of a specific program run in a portable data processing device such as an IC card which includes a microcomputer, ROM, RAM, etc.

Banks have recently issued IC cards which have a RAM for storing an account number and transaction data, a ROM for storing a control program, and a microprocessor. The ROM memorizes a password of the card. Only when the password input in a keyboard of a bank terminal unit coincides with that stored in the data processing device, can the card be used, so that illegal use of the card by a third person is prevented. However, illegal use by its owner is not prevented. For example, the ROM stores a coding process program for the commumucation between the IC card and the host computer, which must be kept secret from the user (owner of the card). The IC card stores many other secret programs as well. The algorithm of these programs can be discovered if they are run millions of times or more. It has so far been impossible to completely prevent illegal use of the IC card by the owner through the discovery of the algorithms of the programs.

SUMMARY OF THE INVENTION

The object of the invention is to provide a data processing device wherein the algorithm of a specific program cannot be discovered. This object can be achieved by limiting the number of times the specific program is run, prolonging the time taken in running the specific program, preventing the continuous running of the specific program, and/or preventing each program from being run in an order which is not predetermined.

BRIEF DESCRIPTION OF THE DRAWINGS

FIG. 2 is a block diagram of the terminal apparatus shown in FIG. 1;

FIG. 3 is a block diagram of the IC card according to the first embodiment;

FIG. 4 is a flow chart of the operation of the first embodiment;

FIG. 5 is a flow chart illustrating the operation of a second embodiment of this invention;

DETAILED DESCRIPTION OF THE PREFERRED EMBODIMENTS

A first embodiment of the data processing device according to the present invention will be described with reference to the accompanying drawings.

Banking facilities have recently issued IC cards in lieu of bankbooks, which memorize the account number and transaction data. The IC card is used in this description as an example of the data processing device. The IC card operates with a bank terminal unit shown in FIGS. 1 and 2 to perform transactions.

Figure 1:
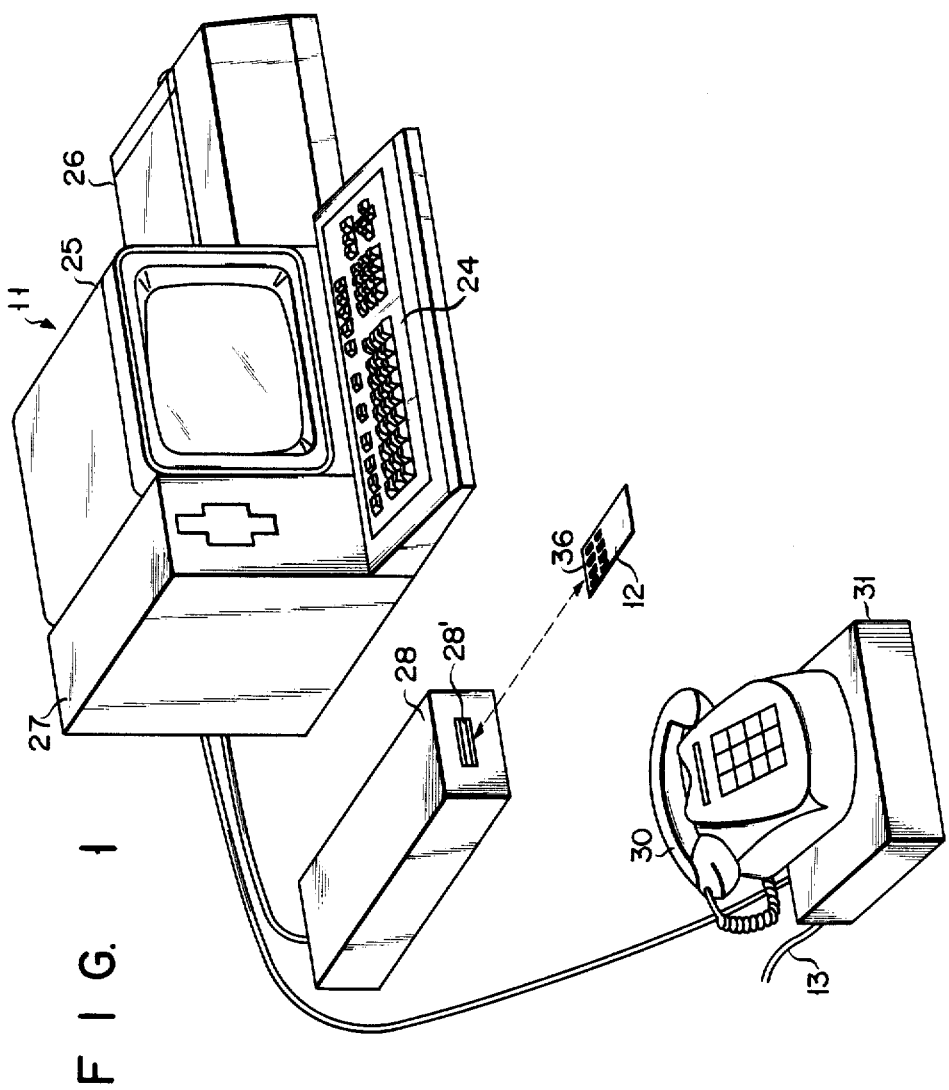
FIG. 1 is a perspective view showing a terminal apparatus used in a bank for use with an IC card according to a first embodiment of the data processing apparatus of the present invention.

FIG. 1 perspectively shows the bank terminal unit. FIG. 2 shows a block circuit thereof. Terminal unit 11 has CPU 21 for its entire control. CPU 21 is connected to ROM 22 storing control programs and to RAM 23 for storing data. Also, CPU 21 is connected to keyboard 24, CRT display 25, printer 26, floppy disc unit 27, IC card reader/writer 28 through interface 29, and modem 31 through interface 32. IC card reader/writer 28 reads and writes data in IC card 12 inserted through card insertion opening 28'. Modem 31 modulates the data fed from CPU 21. By using telephone 30, the modulated data are fed through telephone line 13 to a host computer, etc. Modem 31 demodulates the data fed from the host computer, etc. through line 13 and supplies them to CPU 21. The data communication between CPU 21 and the host computer is performed by coding the data to keep the data secret. A program for producing coding key data used in the coding process is stored in IC card 12, and will be described later.

FIG. 3 shows the structure of IC card 12. CPU 33, which is a microcomputer, is connected to PROM 34 which memorizes control programs, e.g., for producing the above-mentioned secret coding key data producing program necessary for the coding process (hereinafter, a program which must be kept secret from the user is referred to as a "specific program") and for limiting the running of this specific program. PROM 34 also memorizes a password assigned to the owner of the IC card. CPU 33 is also connected to RAM 35 for storing data and to connector 36 which is coupled to a connecting pin (not shown) provided within IC card reader/writer 28.

A system comprising the IC card and the bank terminal unit is generally operated in the following manner. IC card 12 is inserted into insertion opening 28'. Connector 36 of IC card 12 is mechanically and electrically connected to the connecting pin in IC card reader/writer 28. The password is input from keyboard 24, and is fed to CPU 33 of IC card 12 through CPU 21, interface 29 and IC card reader/writer 28. The password is then compared with the password stored in PROM 34.

The operation for limiting the number of times specific programs are run, which is essential to the invention, will now be described. FIG. 4 illustrates the operation of the first embodiment of the invention. In addition to the above-described structure, in the first embodiment, PROM 34 has tables registering the names of specific programs, and RAM 35 has execution counters which count and memorize the number of times the corresponding specific programs are run.

When the power is turned on, the execution counter is cleared in Step 1. In Step 2, the name of a program to be run is input. In Step 3, the name of the input program is compared with that of the programs registered in the tables to judge whether or not the program to be run is the specific program. If it is not the specific program, it is run in Step 6. Then, the operation returns from Step 6 to Step 2 to wait for the input of the name of the next program.

When the program to be run is judged to be the specific one, Step 4 judges whether or not the count value of the execution counter for that program is below a predetermined value. If the value of the execution counter is below or equal to the predetermined value, "1" is counted in the execution counter in Step 5, and the routine goes to Step 6 where the program is executed. If the value of the execution counter is above the predetermined value, the program is not run, and the operation returns from Step 4 to Step 2 to wait for the input of the name of the next program. The predetermined value, which is compared with the count value of the execution counter and indicates the maximun number of times the specific program is allowed to be run, is set above the value at which the specific program is normally run from the turn-on to turn-off of the power and far below the value at which the algorithm of the specific program may be discovered.

In the first embodiment, unless the power of the terminal unit is turned off and then on, the number of times the specific program is run is limited. Thus, it is impossible to execute the specific program millions of times or more to discover the algorithm of the specific program. However, as stated above, the execution counter is cleared when the power is turned on. If the power of the terminal unit is turned off and then turned on again to clear the execution counter, the predetermined number of times may be increased indefinitely. This problem can be eliminated if the count value in the execution counter is stored in PROM 34 before the power is turned off and the execution counter is initialized based on the data in PROM 34 each time the power is turned on again.

The description of FIG. 4 does not refer to the comparison of the password. Generally, the comparison of the password is performed right before the running of the program in Step 6.

A second embodiment of the invention will be described hereinafter. FIG. 5 shows the operation of the second embodiment. The IC card of the second embodiment has PROM 35 for storing tables registering the names of specific programs and tables memorizing a predetermined delay time for each specific program.

When the power is turned on, the name of a program to be run is input in Step 11. In Step 12, it is judged whether the input program is the specific program. If it is not the specific program, the program is run in Step 14. Then, the operation returns to Step 11 to wait for the input of the name of the next program. On the other hand, if the input program is the specific one, a delay time operation is executed in Step 13 before the program is run in Step 14. The delay time is designed to be short in consideration of the normal operation. However, if the delay time operation is repeated millions of times or more, the total delay time becomes immense so that it is, in fact, impossible to run the specific program many times to discover the algorithm of the specific program.

In FIG. 5, the delay time operation is executed before the specific program is run. However, it is possible to execute the delay time operation while or after the specific program is run. In addition, it is possible to register the execution position of the delay time program in the above-mentioned registration table to change the execution position of the delay time program according to each specific program.

Figures 6, 7A, 7B:
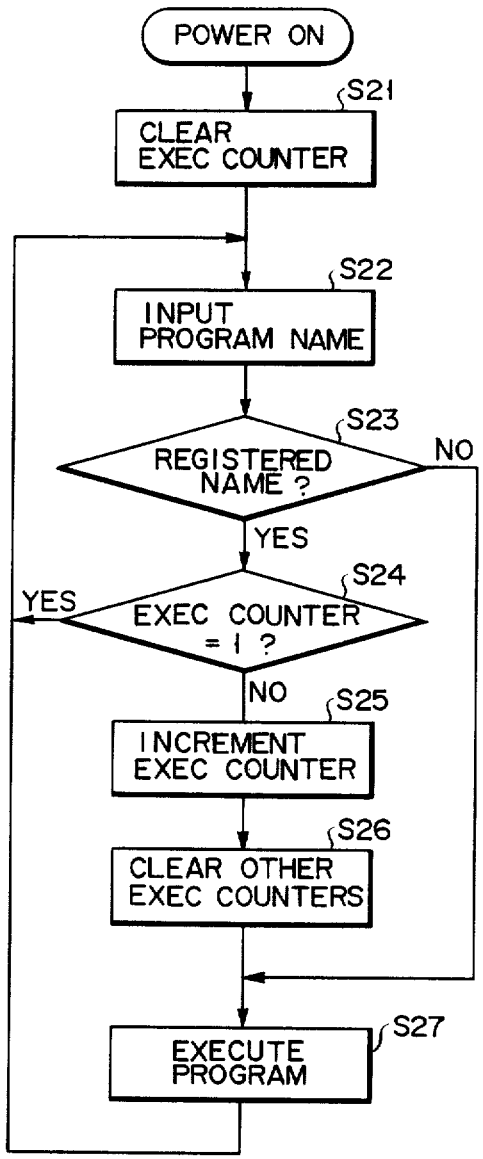
FIG. 6 is a flow chart illustrating the operation of a third embodiment of this invention.
FIG. 7A shows an example of an execution order table Ep used in a fourth embodiment of this invention.
FIG. 7B shows an example of register Ef for registering the name of the program which was formerly run and register En for registering the name of the program which is presently being run, as used in the fourth embodiment.

FIG. 6 shows a third embodiment of the invention, which is designed to prohibit the continuous running of the specific program. As in the first embodiment, PROM 34 has tables registering the names of specific programs, and RAM 35 has execution counters which count and memorize the number of times the corresponding specific program is run.

When the power is turned on, the execution counters are cleared in Step 21. In Step 22, the name of a program to be run is input. In Step 23, it is judged whether or not the input program is a specific one. If the input program is not the specific one, it is run in Step 27. Then, the operation returns from Step 27 to Step 22 to wait for the input of the name of the next program. If the input program is the specific one, Step 24 judges whether or not the count value of the execution counter is "1". If the count value is not "1", "1" is counted in the counter in Step 25, and the execution counters excluding that of the present specific program are cleared. Thereafter, the routine goes to Step 27 where the program is executed. On the other hand, if the count value is "1," the operation returns to Step 22 to wait for the input of the name of the next program.

In the third embodiment, value "1" is set in the execution counter right before the specific program is run, and the execution counter of the specific program is cleared right before another program is run. Therefore, the same specific program cannot be continuously run. The repeated running of the same specific program inevitably involves the running of other intervening specific programs. Twice the normal time is required to repeat the running of the specific prgram. Thus, it is impossible to discover the algorithm of the specific program.

Next, a fourth embodiment will be described. In the fourth embodiment, the order of executing each program is preset. Because the execution of the programs in a different order is impossible, the continuous running of the same program is prevented. To this end, execution order table Ep as shown in FIG. 7A is stored in PROM 34 of IC card 12. Also, RAM 35 has register Ef for registering the name of the formerly run program (or formerly run program name register Ef) and register En for registering the name of the presently run program (or presently run program name register En) as shown in FIG. 7B. Execution order table Ep registers program names 0, A, B, C and D in an order which allows the programs to be run. Because the programs can be run only in the order registered in the execution order table Ep, the repeated running of a program necessarily involves the running of another program and takes a great amount of time. Thus, it is, in fact, impossible to discover algorithm by repeating the program.

Figure 8:
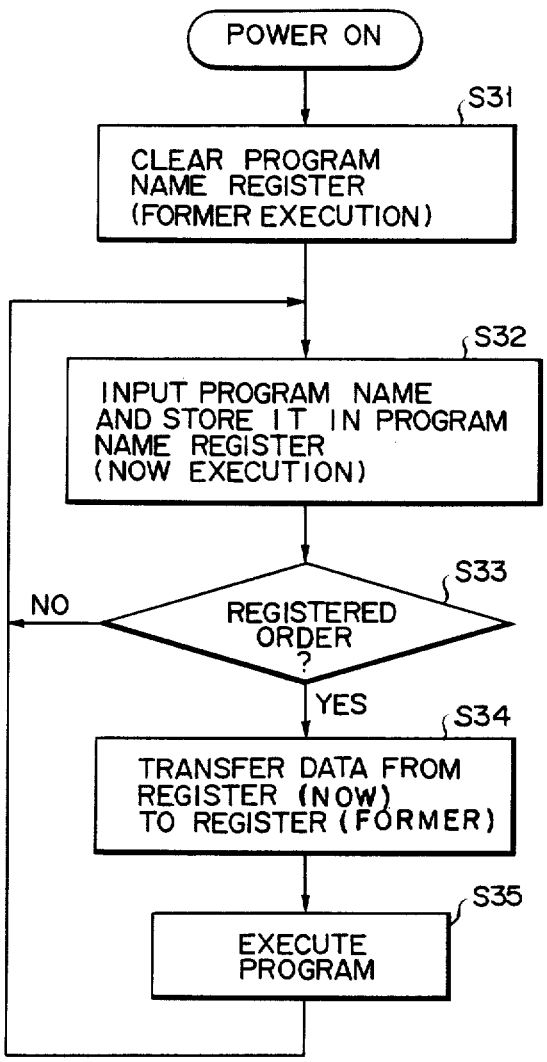
FIG. 8 is a flow chart showing the operation of the fourth embodiment.

The above operation will be described in greater detail with reference to FIG. 8. When the power is turned on, formerly run program name register Ef is cleared in Step 31. In Step 32, the name of the program to be run is input to presently run program name register En. Step 33 judges whether or not the contents of registers Ef and Ep have the order registered in execution order table Ep. If these contents do not have the registered order, the operation goes back to Step 32 to wait for the input of the name of the next program. If they have the registered order, Step 34 transfers the data from register En to register Ef, and Step 35 runs the program. After Step 35, the operation returns to Step 32 to wait for the input of the name of the next program.

In the fourth embodiment, since the order of the programs is predetermined, it is impossible to repeat the running of the specific program in an unregistered order to discover the algorithm of the specific program. In this description, the order of only two programs has been predetermined. However, it is possible to predetermine the order of three or more programs.

The present invention can provide a data processing device wherein the running of a specific program which is secret to the user cannot be repeated many times. Thus, the discovery of the algorithm of the specific program is prevented.

What is claimed is:

1. An IC card designed for use with a read/write terminal device and having a card-shaped housing, comprising:
    memory means for storing data and programs, the programs including a specific program which must be kept secret from uses of the IC card;
    password identification means for receiving a password supplied from said terminal device and judging whether or not the password is correct, according to predetermined criteria;
    arithmetic operation means, connected to said memory means, for running a program specified by a command from said terminal device when the password is judged to be correct by said password identification means;
    means for judging whether or not the program specified by said command is the specific program;
    means for counting the number of times the specific program is run, the counted number being cleared when the IC card is powered off; and
    means for (1) preventing the specific program from being run by said arithmetic operation means after the counter number reaches a predetermined value and for (2) allowing the specific program to run by said arithmetic operation means after the counted number is cleared until the counted number reaches the predetermined value.

2. The device according to claim 1, wherein said memory means and said arithmetic operation means are constituted by semiconductor integrated circuits.

3. The device according to claim 1, wherein said device is an IC card for use with a terminal device.

4. The device according to claim 3, further comprising a non-volatile memory for storing said count value of the number of executions of the specific program when the terminal device is powered off and the count value is preset according to the stored value in the nonvolatile memory when the terminal device is powered on.

5. The device according to claim 1, in which said judging means includes a counter for counting the number of times the specific program is run, and means for resetting the counter to zero when the device is turned on.

6. A data processing device comprising:
    memory means for storing data and programs, the programs including a specific program which must be kept secret from users of the device;
    password identification means for receiving a password externally input and judging whether or not the password is correct, according to predetermined criteria;
    arithmetic operation means, connected to said memory means, for running a predetermined program stored in said memory means when the password is judged to be correct by said password identification means;
    means for judging whether or not the predetermined program is the specific program; and
    means for delaying a preset time before the predetermined program is run by said arithmetic operation means if the predetermined program is the specific program and for immediately running the predetermined program if the predetermined program is not the specific program.

7. The device according to claim 6, wherein said memory means and said arithmetic operation means are constituted by semiconductor integrated circuits.

8. The device according to claim 6, wherein said device is an IC card for use with a terminal device.

9. An IC card adapted to be used with a read/write terminal device and having a card shape housing, comprising:
    memory means for storing data and programs, the programs including first and second specific programs which must be kept secret from users of the IC card;
    password identification means for receiving a password supplied from said terminal device and judging whether or not the password is correct according to predetermined criteria;
    arithmetic operation means, connected to said memory means, for running a program specified by a command from said terminal device when the password is judged to be correct by said password identification means;
    means for judging whether or not the program specified by said command is the first specific program; and
    means for periodically preventing continuous running of the first specific program by said arithmetic operation means wherein after every running of the first specific program, a second specific program must be run before the first specific program can be run again.

10. The device according to claim 9, wherein said memory means and said arithmetic operation means are constituted by semiconductor integrated circuits.

11. The device according to claim 9, wherein said device is an IC card for use with a terminal device.

12. The device according to claim 9, in which said judging means includes:
    counters for the specific programs, whose count is the number of times the specific program is run,
    means for resetting the counters for the programs other than the specific program immediately running, and
    means for preventing the execution of the specific program, when said judging means judges a program is the specific program and the counter for the specific program indicates the specific program was run immediately prior to the current run.

* * * * *